(12) United States Patent
Kohli

(10) Patent No.: US 11,449,852 B2
(45) Date of Patent: Sep. 20, 2022

(54) SYSTEMS AND METHODS FOR USE IN FACILITATING NETWORK TRANSACTIONS

(71) Applicant: MASTERCARD INTERNATIONAL INCORPORATED, Purchase, NY (US)

(72) Inventor: Manoneet Kohli, White Plains, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/803,598

(22) Filed: Feb. 27, 2020

(65) Prior Publication Data

US 2020/0279243 A1 Sep. 3, 2020

Related U.S. Application Data

(60) Provisional application No. 62/811,854, filed on Feb. 28, 2019.

(51) Int. Cl.
*G06Q 20/32* (2012.01)
*G06Q 20/10* (2012.01)
(Continued)

(52) U.S. Cl.
CPC ....... *G06Q 20/3223* (2013.01); *G06Q 20/108* (2013.01); *G06Q 20/3674* (2013.01); *G06Q 20/40145* (2013.01)

(58) Field of Classification Search
CPC .................................................. G06Q 20/3223
See application file for complete search history.

(56) References Cited

U.S. PATENT DOCUMENTS

2013/0031009 A1* 1/2013 Kapoor .............. G06Q 20/3278 705/77
2014/0379404 A1* 12/2014 Bastide ............. G06Q 10/1095 705/7.19
2018/0114216 A1* 4/2018 Joseph ............. G06Q 20/40145

FOREIGN PATENT DOCUMENTS

JP 2007-213305 8/2007
JP 2007213305 A * 8/2007
(Continued)

OTHER PUBLICATIONS

"Alhothaily et al., QuickCash: Secure Transfer Payment Systems, Jun. 13, 2017, Sensors, vol. 17, entire document" (Year: 2017).*

*Primary Examiner* — Hani M Kazimi
*Assistant Examiner* — Adam Hilmantel
(74) *Attorney, Agent, or Firm* — Harness, Dickey & Pierce, P.L.C.

(57) ABSTRACT

Systems and methods are provided for use in facilitating network transactions. In connection therewith, a server receives a request from an application of a requestor mobile device and polls sender mobile devices for location data, where a subset of the sender mobile devices is within a defined distance of the requestor mobile device. The server then receives a response from one of the subset of sender mobile devices and presents the response to the application of the requestor mobile device. Upon acceptance of the response, the server transmits the acceptance to the sender mobile device, thereby enabling delivery of an amount requested to a requestor user associated with the requestor mobile device in exchange for a digital transaction from an account of the requestor user to an account of a sender user associated with the sender mobile device.

14 Claims, 7 Drawing Sheets

(51) Int. Cl.
*G06Q 20/40* (2012.01)
*G06Q 20/36* (2012.01)

(56) References Cited

FOREIGN PATENT DOCUMENTS

| | | |
|---|---|---|
| JP | 2010-235269 | 10/2010 |
| JP | 2010235269 A * | 10/2010 |
| WO | WO2016/157114 | 3/2016 |
| WO | WO-2016157114 A1 * | 10/2016 |

* cited by examiner

SYSTEMS AND METHODS FOR USE IN FACILITATING NETWORK TRANSACTIONS

CROSS-REFERENCE TO RELATED APPLICATION

This application claims the benefit of, and priority to, U.S. Provisional Application No. 62/811,854 filed on Feb. 28, 2019. The entire disclosure of the above-referenced application is incorporated herein by reference.

FIELD

The present disclosure generally relates to systems and methods for use in facilitating network transactions, and in particular, to systems and methods for providing an automated machine, on demand, for initiating network transactions between users.

BACKGROUND

This section provides background information related to the present disclosure which is not necessarily prior art.

Entities are known to transfer funds through network transactions (e.g., through digital payments, etc.). In one example, the network transactions may involve different payment accounts, whereby users associated with the payment accounts purchase products or services from merchants and/or service providers and fund the purchases by the payment accounts. Also, it is known for users to transfer payments to other users through person-to-person, or P2P, transactions, and which again involve payment accounts. The P2P transactions are available through mobile applications, including, for example, the PayPal® and Venmo® mobile applications. Apart from such digital payments or transfers, users are also still known to provide checks or cash payments to merchants and/or services providers in exchange for products or services.

DRAWINGS

The drawings described herein are for illustrative purposes only of selected embodiments and not all possible implementations, and are not intended to limit the scope of the present disclosure.

Figure 1:
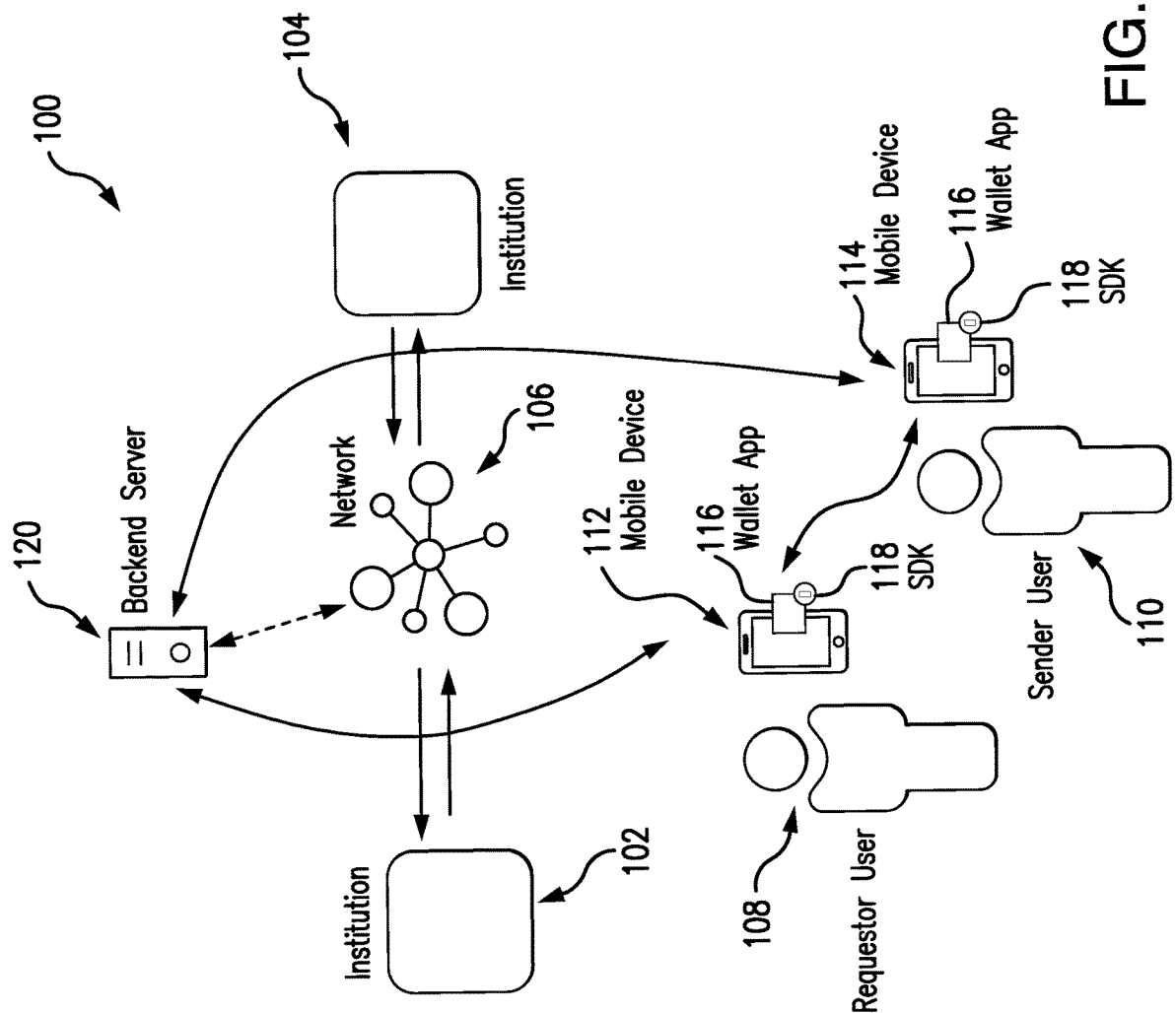
FIG. 1 is an exemplary system of the present disclosure suitable for use in facilitating network transactions.
Figure 3:
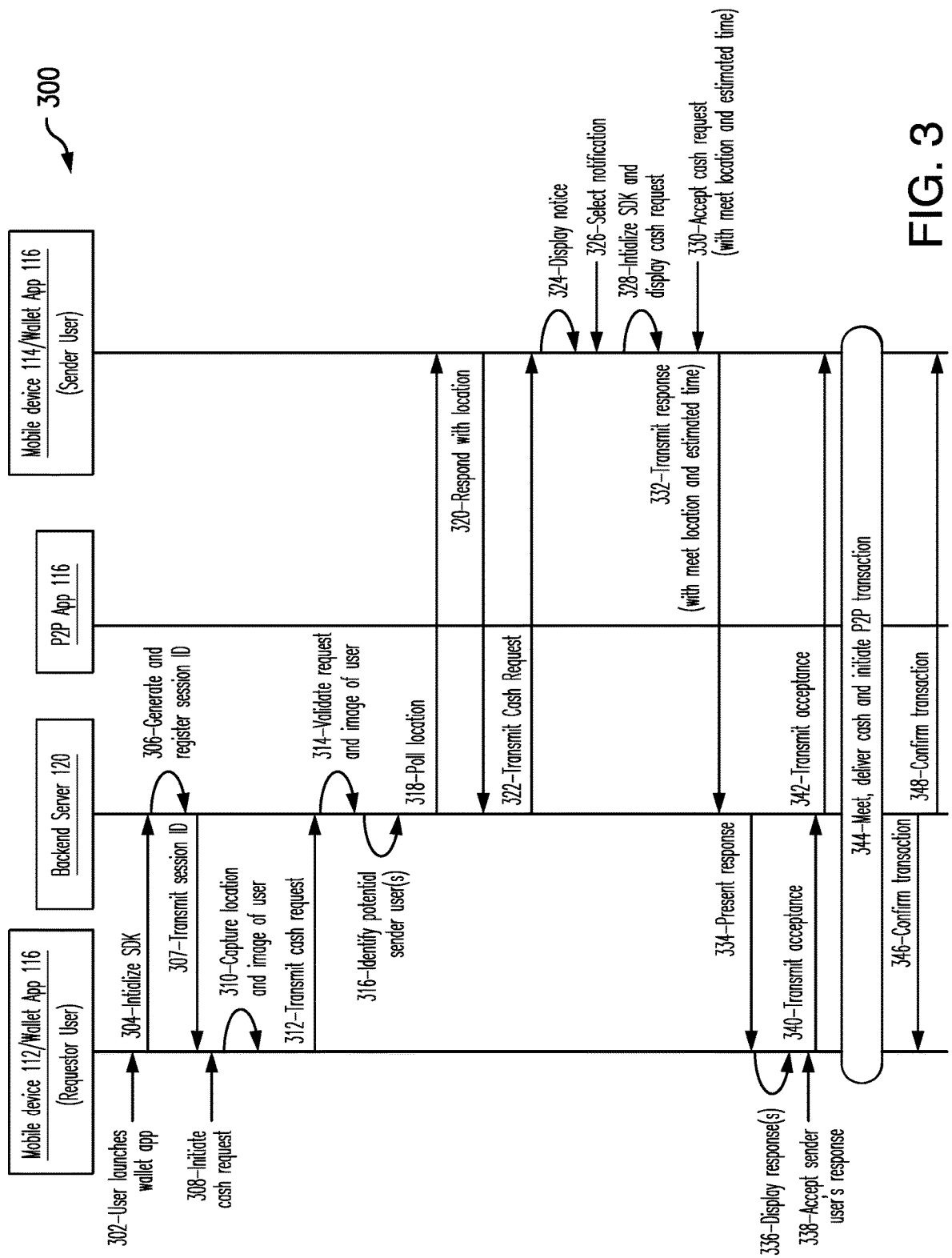

FIG. 3 is an exemplary method that may be implemented in the system of FIG. 1 for use in facilitating a network transaction between a sender user and a requestor user, which includes delivery of cash to the requestor user and payment for the cash to the sender user through a digital payment transaction; and FIGS. 4-15 illustrate exemplary interfaces that may be displayed to either a requestor user or a sender user in the system of FIG. 1 and/or the method of FIG. 3 to facilitate a network transaction between the requestor user and the sender user.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Transactions may be funded through a number of different mechanisms, including cash, digital payments, checks, etc. Certain merchants express preferences for and/or limitations to certain types of payments. For example, a merchant (or service provider) may not have card swipe or tap capability, whereby conventional digital payments are not accepted by the merchant. In various instances, therefore, a user may need cash to fund a transaction with the merchant. Or, the user may need cash to pay another user for one or more reasons. Uniquely, the systems and methods herein permit wallet applications to perform as on-demand automated teller machines (ATMs). In particular, when a requestor user is in need to cash, the requestor user uses the wallet application to submit a cash request. The wallet application, in turn, searches for one or more sender users nearby the requestor user (where, in advance of the search, the sender users are enrolled for such service). The identified sender user(s) is(are) notified of the request and is(are) permitted to view the cash request and to accept the cash request. When accepted, the users are directed to a meeting location, where the cash is then provided from the sender user to the requestor user, and while a digital transaction between payment accounts associated with the users is commenced (through their wallet applications) (i.e., a digital P2P transaction). In this manner, the wallet application enables the sender user to act as on-demand ATM to the requestor user. As such, following the innovations therein, cash is available not only at conventional ATMs, but also at/from sender users having the wallet applications and willing to act as an on-demand ATMs.

FIG. 1 illustrates an exemplary system 100, in which one or more aspects of the present disclosure may be implemented. Although the system 100 is presented in one arrangement in FIG. 1, other embodiments may include systems arranged otherwise depending, for example, on a manner in which payment account transactions are initiated, a manner in which wireless communications are facilitated, users involved in the transactions, etc.

In the illustrated embodiment, the system 100 generally includes banking institutions 102 and 104 and a payment network 106, each coupled to (and in communication with) one or more networks. The one or more networks are represented in FIG. 1 by the various arrowed, solid lines and each may include, without limitation, a local area network (LAN), a wide area network (WAN) (e.g., the Internet, etc.), a mobile network, and/or another suitable public and/or private network capable of supporting communication among two or more of the parts illustrated in FIG. 1, or any combination thereof. For example, one of the networks may include multiple different networks, such as a private payment transaction network made accessible by the payment network 106 to the banking institutions 102 and 104 and, separately, the public Internet, which is accessible as desired by the payment network 106 and one or more devices associated with users in the system 100, etc.

The banking institution 102 in the system 100 is configured to issue one or more accounts (e.g., payment accounts, etc.). In this example, the banking institution is associated with a user 108 (i.e., a requestor user) and has issued a payment account for the requestor user 108. Similarly, the banking institution 104 is configured to issue one or more accounts (e.g., payment accounts, etc.). And, in this example, the banking institution 104 is associated with a user 110 (i.e., a sender user) and has issued a payment account for the sender user 110. The accounts may include, without limitation, credit accounts, debit accounts, prepaid accounts, savings accounts, etc. With that said, in various embodiments, both of the banking institutions 102 and 104 may be other entities (e.g., financial or otherwise, etc.) associated with the users in other system embodiments.

Each of the banking institutions 102 and 104 is coupled to and/or is in communication with the payment network 106 (via one or more networks), whereby the payment network 106 is configured to facilitate transactions (broadly, network transactions) between different accounts issued by the banking institutions 102 and 104 (and other banking institutions). In particular, the payment network 106 is configured to facilitate authorization of the transactions and, later, clearing and settlement of the transactions between the accounts involved therein. While the payment network 106 is provided to facilitate the transactions in this embodiment, it should be appreciated that another service and/or entity (e.g., a P2P service provider, etc.) may be employed in other system embodiments, in lieu of or in addition to the payment network 106, to perform one or more of these operations.

The users 108 and 110 in the system 100 are associated with mobile devices 112 and 114, respectively. The mobile devices 112 and 114 may each include portable communication devices, such as, for example, smartphones, tablets, laptops, etc. And, in the illustrated embodiment, the mobile devices 112 and 114 each include a virtual wallet application 116 (or P2P application). For each of the mobile devices 112 and 114, the virtual wallet application 116 includes executable instructions, stored in a non-transitory storage media within the given mobile devices 112 and 114, which cause the mobile devices 112 and 114 to perform the various operations described herein. In various embodiments, the virtual wallet application 116 may include, for example, PayPass® from MasterCard®, Apple Pay® from Apple®, PayWave® from Visa®, etc., or other suitable application offered by one or more of the banking institutions 102 and 104, the payment network 106, another entity, etc.

In this exemplary embodiment, the virtual wallet application 116 is installed in each of the mobile devices 112 and 114 and is provisioned with a payment account credential associated with the payment account issued to the respective one of the users 108 and 110 with which the mobile devices 112 and 114 are associated. Specifically, the virtual wallet application 116 in the mobile device 112 is provided with a payment account credential for the payment account issued, by the banking institution 102, to the requestor user 108. Likewise, the virtual wallet application 116 in the mobile device 114 is provided with a payment account credential for the payment account issued, by the banking institution 104, to the sender user 110. In both cases, the payment account credential may include, for example, a token, a primary account number (PAN), etc.

In connection therewith, each of the users 108 and 110 has enrolled with an "on-demand ATM" service available with/ through the virtual wallet application 116, for example, by checking/selecting a box in the application 116 or by otherwise designating enrollment in the virtual wallet application 116 (or associated website, etc.). In this exemplary embodiment, the "on-demand ATM" service is included in the virtual wallet application 116 through a software development kit or SDK 118. For each of the mobile devices 112 and 114, the SDK 118 includes executable instructions, which cause the mobile devices 112 and 114 to operate as described herein. The SDK 118 is a plug-in part of the virtual wallet application 116. And, in this exemplary embodiment, the SDK 118 is provided by or on behalf of a backend server 120 of the payment network 106. The backend server 120 is configured, by executable instructions, to interact with the SDK 118 in order to coordinate the on-demand ATM service described herein (among other operations).

It should be appreciated that, while illustrated as part of the payment network 106 (as indicated by the dotted lines in FIG. 1), the backend server 120 may be included and/or integrated into one of the banking institutions 102 and 104, or with one or more other entities. Or, in various embodiments, the backend server 120 may be a standalone entity specific to providing virtual wallet functionality. In addition, while only described with reference to the wallet application 116, it should be appreciated that the backend server 120 may interact with multiple different types of wallet applications (other than the virtual wallet application 116) or other applications in general, thereby enabling the on-demand ATM service across the different applications. In general, though, the applications will include the SDK 118 to enable the on-demand ATM service described herein.

Figure 2:
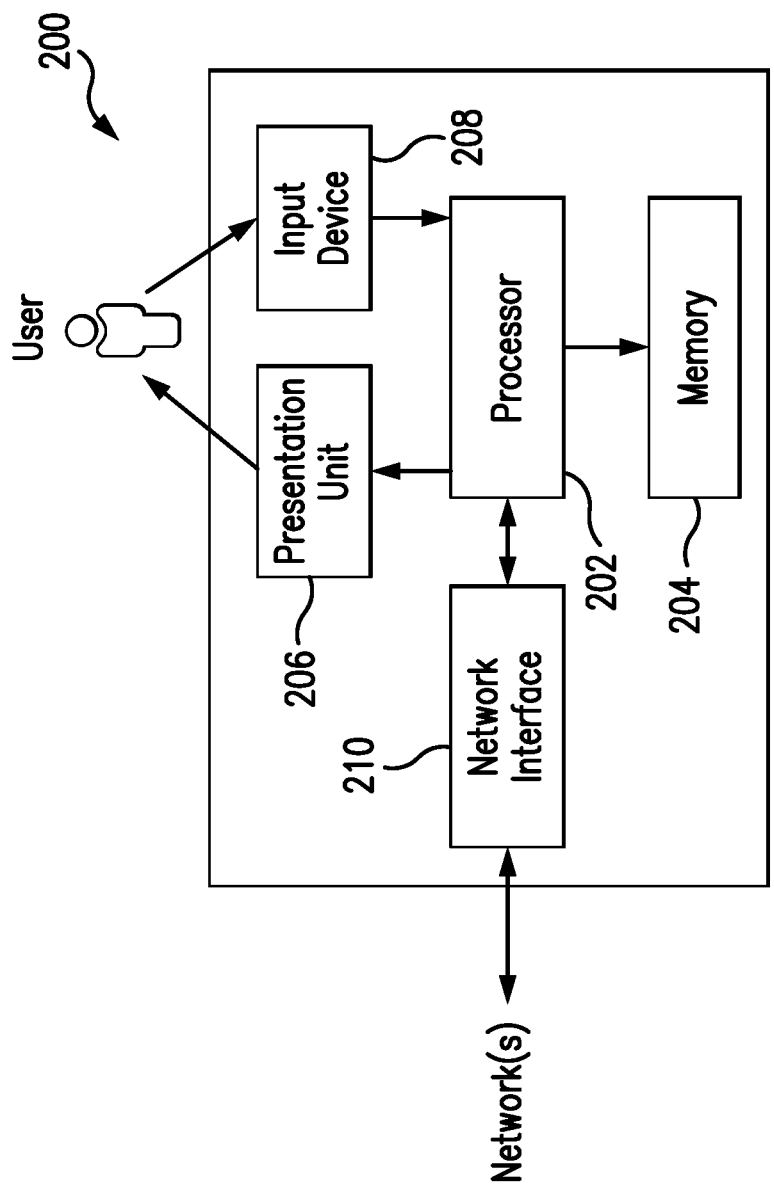
FIG. 2 is a block diagram of a computing device that may be used in the exemplary system of FIG. 1.

FIG. 2 illustrates an exemplary computing device 200 that can be used in the system 100. The computing device 200 may include, for example, one or more servers, workstations, personal computers, POS terminals, laptops, tablets, smartphones, PDAs, etc. In addition, the computing device 200 may include a single computing device, or it may include multiple computing devices located in close proximity or distributed over a geographic region as a network of computing devices, so long as the computing devices are specifically configured to function as described herein. In particular, in the exemplary system 100 of FIG. 1, each of the banking institutions 102 and 104, the payment network 106, and the backend server 120 should be understood as being implemented in (and/or otherwise including) one or more computing devices consistent with the computing device 200. In addition, the mobile devices 112 and 114 are also consistent with computing device 200. That said, the system 100 should not be considered to be limited to the computing device 200, as described below, as different computing devices and/or arrangements of computing devices may be used in other embodiments. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, QR codes (or other computer readable indicia), location data, image data, user profile data, and/or other types of data (and/or data structures) suitable for use as described herein. Furthermore, in various embodiments, executable instructions may be stored in the memory 204 for execution by the processor 202 to cause the processor 202 to perform one or more of the operations described herein, such that the memory 204 is a physical, tangible, and non-transitory computer readable storage media. Such instructions often improve the efficiencies and/or performance of the processor 202 that is performing one or more of the various operations herein. It should be appreciated that the memory 204 may include a variety of different memories, each implemented in one or more of the functions or processes described herein.

In addition in the exemplary embodiment, the computing device 200 includes a presentation unit 206 that is coupled to (and is in communication with) the processor 202 (however, it should be appreciated that the computing device 200 could include output devices other than the presentation unit 206, etc.). The presentation unit 206 outputs information (e.g., a notification associated with a cash request, an image of another user, etc.), either visually or audibly, to a user of the computing device 200, for example, to one or the users 108 and 110 in the system 100, to users associated with other parts of the system 100, etc. And, various interfaces (e.g., as defined by applications, webpages, etc.) may be displayed at computing device 200, and in particular at presentation unit 206, to display such information. The presentation unit 206 may include, without limitation, a liquid crystal display (LCD), a light-emitting diode (LED) display, an organic LED (OLED) display, an "electronic ink" display, speakers, etc. In some embodiments, presentation unit 206 may include multiple devices.

The computing device 200 also includes an input device 208 that receives inputs from the user of the device (i.e., user inputs) such as, for example, cash requests, cash request acceptances, etc. The input device 208 is coupled to (and is in communication with) the processor 202 and may include, for example, a keyboard, a pointing device, a mouse, a touch sensitive panel (e.g., a touch pad or a touch screen, etc.), another computing device, and/or an audio input device. Further, in various exemplary embodiments, a touch screen, such as that included in a tablet, a smartphone, or similar device (e.g., the mobile devices 112 and 114, etc.), may behave as both the presentation unit 206 and the input device 208.

In addition, the illustrated computing device 200 also includes a network interface 210 coupled to (and in communication with) the processor 202 and the memory 204. The network interface 210 may include, without limitation, a wired network adapter, a wireless network adapter (e.g., a near field communication (NFC) adapter, a ZigBee adapter, an RFID adapter, a Bluetooth adapter, etc.), a global position system (GPS) adapter, a mobile network adapter, or other device capable of communicating to/with one or more different networks, including one or more of the networks in FIG. 1. Further, in some exemplary embodiments, the computing device 200 may include the processor 202 and one or more network interfaces (including the network interface 210) incorporated into or with the processor 202.

Referring again to FIG. 1, in use/operation of the system 100, from time to time, the requestor user 108 will be in need of cash to transact with a merchant, service provider, or another user. However, an ATM may not be available to the user 108 or the user 108 may not have available cash in a checking account accessible through the ATM. As such, through the present disclosure, the requestor user 108 can initiate the on-demand ATM service included in the virtual wallet application 116 at his/her mobile device 112.

Specifically, the requestor user 108 accesses the wallet application 116 at the mobile device 112 (thereby initiating a session) and authenticates himself/herself thereto (e.g., by biometric, PIN, passcode, etc.). The SDK 118 of the wallet application 116 is then initialized, which in turn configures the mobile device 112 to generate a session key (or session ID) for the mobile device 112 and for the current interaction (or session) by the requestor user 108 with the wallet application 116. Thereafter, as part of the session, the mobile device 112, as configured by the wallet application 116 and/or the SDK 118, provides the option to the user 108 to submit a cash request to another wallet user (e.g., the sender user 110, etc.). When selected, the mobile device 112, as configured by the wallet application 116 and/or the SDK 118, identifies a location of the mobile device 112 (e.g., by GPS or GeoIP, etc.), solicits an amount of cash to be "withdrawn", and solicits an image of the user 108 (e.g., a facial image, etc.). In response, the requested amount and the image are provided/presented by the user 108, whereby the mobile device 112, as configured by the wallet application 116 and/or the SDK 118, receives and/or captures the amount and the image. That said, either after accessing the wallet application 116 or after selection of the option to submit a cash request, the mobile device 112, as configured by the wallet application 116 and/or the SDK 118, either generates the session ID for the cash request (as described above) or, alternatively, in other embodiments, the mobile device 112 may be configured to receive (or retrieve) the session ID from the backend server 120 for the given session/interaction with the wallet application 116. The mobile device 112, as configured by the wallet application 116 and/or the SDK, then compiles a cash request (including an identifier associated with the user 108 (and/or the account and/or the wallet application 116 (e.g., an application ID, etc.), etc.), the amount of cash, the image of the user 108 (and/or one or more other biometrics of the user 108), the location of the mobile device 112, and the session ID for the cash request, etc.). In various embodiments, the cash request is protected through channel level encryption (e.g., SSL encryption, etc.), whereby data may be provided through an established authenticated channel from the mobile device 112 to the backend server 120 (e.g., and potentially extending to the mobile device 112 and the payment network 106, etc.). Then, the mobile device 112, as configured by the wallet application 116 and/or the SDK 118, transmits the cash request to the backend server 120.

In turn, the backend server 120 is configured to validate the cash request and/or the requestor user 108. For example, the backend server 120 may be configured to validate the image of the user 108 against a reference image for the user 108 (e.g., associated with the account issued by the banking institution 102, provided during registration of the virtual wallet application 116, etc.). To do so, the backend server 120 may be configured to call an application programming interface (API) associated with one or more validation services, whereby a result is returned by the validation service(s) (e.g., via a suitable notification service associated with the mobile device 112, etc.) indicative of the match or no match of the image of the user 108 to one or more references associated with the user 108 and/or the user's account. The backend server 120 may be further configured to validate the cash request based on the application ID, session ID or the identifier included in the cash request (e.g., based on the session ID generated by the mobile device 112 (or, in some embodiments, by the backend server 120), a profile associated with the wallet application 116 and/or the requestor user 108, etc.).

When the cash request is validated (e.g., by way of validating the image of the user 108, etc.), the backend server 120 is configured to poll one or more mobile devices that are enrolled to be "on-demand ATMs" to determine a location of the mobile devices (e.g., to request, retrieve, etc. location data for the mobile devices, etc.). That is, only the mobile devices enrolled to be an on-demand ATM are polled in this exemplary embodiment. In response, the mobile device 114 (i.e., an enrolled mobile device), for example, as configured by the virtual wallet application 116 and/or the SDK 118 (and/or an operating system of the mobile device 114), determines and responds with its location (e.g., via GPS or GeoIP, etc.). The backend server 120 is configured to then select one or more of the responding mobile devices (e.g., the mobile device 114, etc.) within the vicinity of the mobile device 112 (e.g., within 0.5 miles, within 1 mile, within 3 miles, etc.) (i.e., nearby mobile devices) (as a subset of the responding mobile devices). It should be appreciated that the backend server 120 may be further configured to select the mobile device based on information associated with the mobile device, accounts provisioned thereto, and/or users thereof (e.g., age of a corresponding account, a service rating of the user, prior on-demand ATM activity, etc.). The backend server 120 is configured to then push a notification to each of the selected mobile devices (e.g., via suitable notification services associated with the mobile devices, etc.), including the mobile device 114 (in this embodiment, as a selected mobile device), via the virtual wallet application 116 and/or the SDK 118.

Upon receipt of the notification from the backend server 120, the mobile device 114, as configured by the wallet application 116 and/or the SDK 118, displays a notification (e.g., an application banner, etc.) to the user 110. The user 110, in turn, may either select the notification to view details of the requested transaction (thereby initiating a session) or ignore the notification. When selected, the mobile device 114, as configured by the wallet application 116, initializes the SDK 118, which, in turn, causes the mobile device 114 to generate a session ID for the mobile device 114 and for the current interaction (or session) by the sender user 110 with the wallet application 116 (or, potentially, in other embodiments, causes the mobile device 114 to instead request and receive/retrieve the session ID from the backend server 120 for the given session/interaction with the mobile device 114 and wallet application 116) (e.g., based on preconfigured logic, etc.) and then to communicate the session ID to the backend server 120 (e.g., via the channel level encryption therebetween, etc.). The backend server 120 is configured to receive the session ID and to validate the session ID from the mobile device 114 (e.g., to ensure security and/or to control validations for threats, etc.) (e.g., based on preconfigured session ID validate logic, etc.) Thereafter, the mobile device 114, as configured by the wallet application 116 and/or the SDK 118, displays the details of the cash request to the user 110. The details of the cash request include, generally, the amount of cash desired. The cash request, as displayed, may further includes the image of the user 108 (and/or one or more other biometrics of the user 108) and one or more details about the user 108 (e.g., a general location, etc.). The user 110 may then decide whether to accept the cash request (e.g., depending on whether the user possesses the desired cash, the image of the user 108, or other relevant reason, etc.). When the user 110 decides to accept the cash request, the user 110 provides an accept input to the mobile device 114. In connection therewith, the mobile device 114, as configured by the wallet application 116 and/or the SDK 118, solicits a location at which to meet (e.g., a nearby merchant, etc.), a designation of an estimated delivery time, and an image of the user 110. Upon receipt of the same, the mobile device 114, as configured by the wallet application 116 and/or the SDK 118, provides the acceptance, the location to meet, the estimated delivery time, and the image of the user 110 (and potentially, other identifying information associated with the user 110 (such as one or more other biometrics of the user 110, etc.) and/or the user's account, etc.) to the backend server 120 (e.g., via the channel level encryption therebetween, etc.).

The backend server 120 is configured to provide the acceptance from the mobile device 114 (and from other mobile devices within the vicinity of the mobile device 112, if applicable), to the mobile device 112, and specifically, the virtual wallet application 116 and/or SDK 118 therein. It should be appreciated that the backend server 120 may be configured to filter out ones of the acceptances based on, for example, a rating of the sender user, the estimated time and/or meet location of the acceptance, etc., prior to submitting the final ones of the acceptances to the user 108.

Upon receipt, the mobile device 112, as configured by the wallet application 116 and/or the SDK 118, displays the acceptance(s) to the user 108, including the various data associated therewith (e.g., the meet location and the estimated time (and potentially, the image of the user 110), etc.). The user 108 then selects the user 110, in this example, to be the on-demand ATM, for example, based on the convenience of the meet location and the estimated time, etc. In connection therewith, the mobile device 112, as configured by the wallet application 116 and/or the SDK 118, provides a selection of the acceptance of the user 110 to the backend server 120.

In this exemplary embodiment, the backend server 120 is configured to notify each of the sender users who accepted the cash request of either being selected or not. For the selected sender user (i.e., the sender user 110 in this example), the backend server 120 is configured to provide a notification to the users 108 and 110 with instructions to meet at the location at the estimated time, as indicated by the user 110 in his/her response. And, the users 108 and 110 proceed to the location to meet. Once at the location, the users 108 and 110 identify each other from the images of the other user at the mobile devices 112 and 114. The users 108 and 110 then initiate a P2P digital transaction between the accounts provisioned to the virtual wallet application 116, and then (or at the same time), the user 110 provides the cash to the user 108. In particular, when the cash is received by the user 108, the user 108 provides a cash received input to the mobile device 112. In turn, the mobile device 112, as configured by the wallet application 116 and/or the SDK 118, provides a payment account credential to the mobile device 114 (e.g., in a form of a QR code, including the credential, the session ID for the mobile device 112, etc. via NFC communication; etc.), and the mobile device 114, as configured by the wallet application 116 and/or the SDK 118, initiates the transaction through the payment network 106 and the backend server 120 (i.e., a pull transaction processed by the payment network 106 and the banking institutions 102 and 104 in a conventional manner). It should be appreciated that the transaction may be initiated in the opposite direction as well (i.e., as a push transaction by the mobile device 112) (prior to or after delivery of the cash from the sender user 110 to the requestor user 108).

When complete, the backend server 120 is configured to transmit an event notification of the transfer to each of the users 108 and 110, at the mobile devices 112 and 114 (and at the virtual wallet application 116 therein).

FIG. 3 illustrates an exemplary method 300 for use in facilitating a network transaction through use of an on-demand ATM service (and which may implemented through the system 100). The exemplary method 300 is described with reference to the mobile device 112 (and the virtual wallet application 116 and SDK 118 therein), the mobile device 114 (and the virtual wallet application 116 and SDK 118 therein), and the backend server 120, as well as other aspects of the system 100, and also to the computing device 200. However, it should be understood that the method 300 is not limited to the system 100 or the computing device 200. And, likewise, the systems and the computing devices herein should not be understood to be limited to the exemplary method 300.

In addition, the method 300 is described with reference to the multiple exemplary interfaces 400-1500 in FIGS. 4-15, which include multiple interfaces to be displayed to the requestor user 108 or the sender user 110 (at their respective mobile devices 112 or 114) (e.g., at presentation units 206 thereof, etc.) in connection with performing a network transaction for cash through use of the on-demand ATM services described herein (in exchange for a P2P digital transaction). However, the method 300, and more generally the methods and systems described herein, should not be understood to be limited to the exemplary interfaces 400-1500 provided herein, as other interfaces may be provided to the users 108, 110 in other embodiments.

Initially in the method 300, it should be understood (as described above) that each of the users 108 and 110 have the virtual wallet application 116 installed and active in their mobile devices 112 and 114, respectively. In addition, each is enrolled with the on-demand ATM service, to be an on-demand ATM, whereby the users 108 and 110 are willing to provide cash in exchange for a P2P digital transaction.

Figures 4, 5:
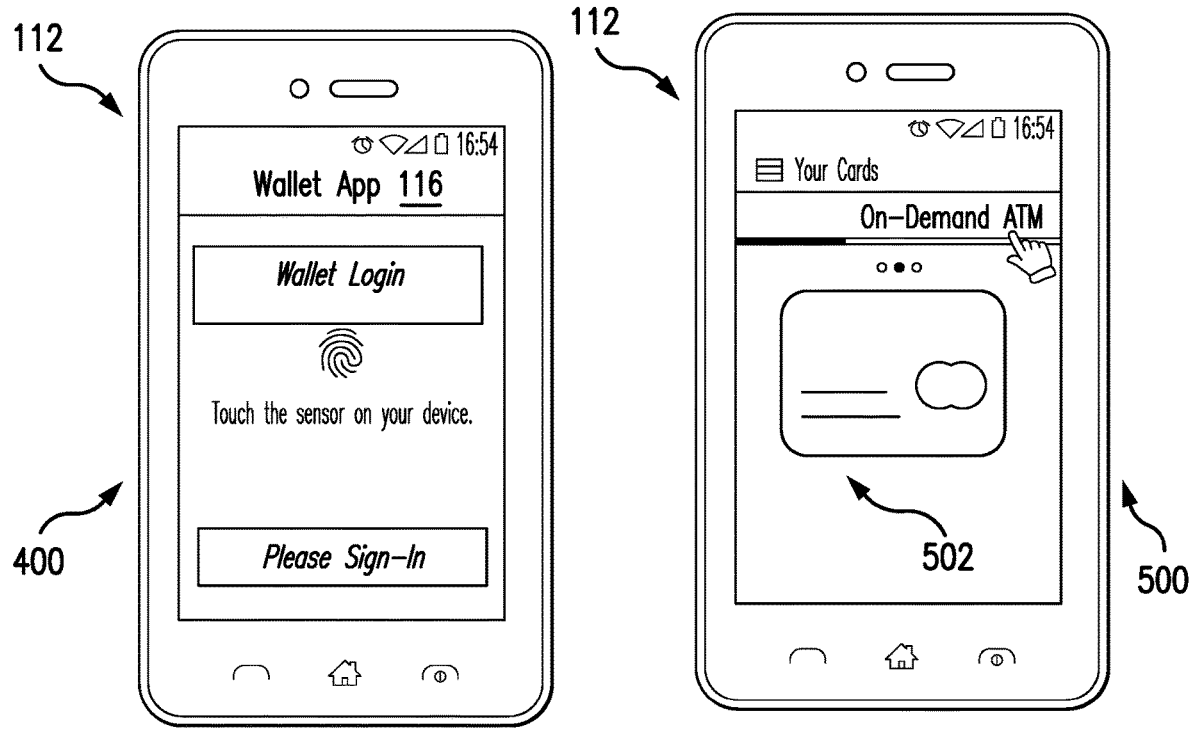

In this example, the user 108 decides to purchase a product for $30 from a merchant (not shown), which only accepts cash, but the user 108 only has $5 in cash. As such, the user 108 is in need of additional cash (i.e., $25). Consequently, the user 108 launches, at 302, the virtual wallet application 116 at the mobile device 112 and selects the "on-demand ATM" option, which causes the SDK 118 at the mobile device 112 to be initialized, at 304. When initialized, the SDK 118 communicates with the backend server 120, which causes the backend server 120 (in this embodiment) to generate and register in memory (e.g., the memory 204, etc.), at 306, a session ID for the mobile device 112 (and the current interaction of the requestor user 108 with the wallet application 116 at the mobile device 112) and returns, at 307, the session ID to the mobile device 112. In connection therewith, the user 108 may be authenticated when launching the wallet application 116 and/or selecting the "on-demand ATM" option (at 302) (although this is not required in all embodiments). In connection therewith, FIG. 4 illustrates an exemplary interface 400 that may be displayed to the requestor user 108 at the mobile device 112 (via the wallet application 116) (e.g., as part of operation 302, etc.), wherein upon launching the wallet application 116, the user 108 is requested to authenticate himself/herself by use of a fingerprint (or other biometric) (or, alternatively, by use of a passcode, a PIN, or a password, etc.). FIG. 5 then illustrates an exemplary interface 500 in which, upon accessing the wallet application 116, the requestor user 108 may select the desired payment account (and corresponding payment card 502) to fund the underlying P2P digital transaction and the on-demand ATM option 502 to initiate the on-demand ATM service (and transaction).

Figures 6, 7:
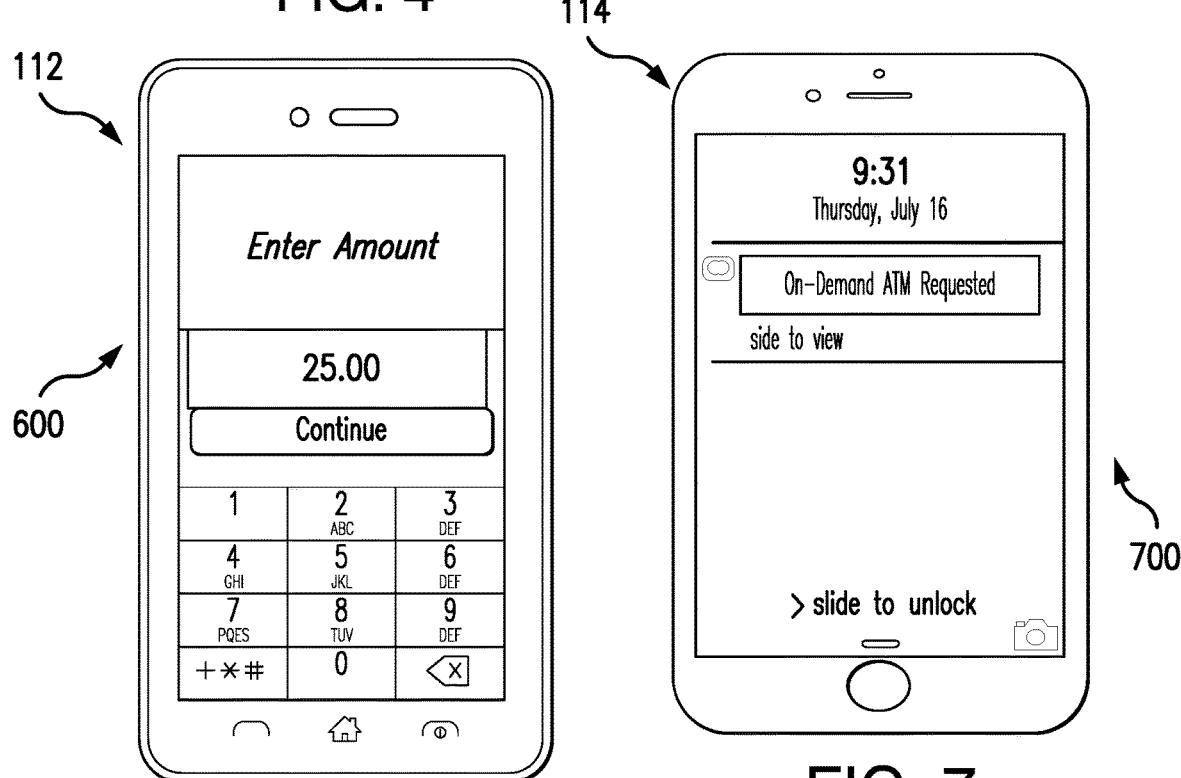

Thereafter, the user 108 initiates, at 308, a cash request (e.g., by selecting the on-demand ATM option in the exemplary interface 500, etc.), after which the user 108 enters an amount of cash desired and selects to submit the cash request. The cash request includes, generally, an amount of cash needed (e.g., $25 in this example, etc.). FIG. 6 illustrates an exemplary interface 600 that may be displayed to the requestor user 108 at the mobile device 112 (via the wallet application 116 and/or the SDK 118), wherein the user 108 is able to enter the amount of cash desired (e.g., $25 in this example, etc.) and selects to submit the cash request. In response to the cash request, the virtual wallet application 116 of the recipient user 108 captures, at 310, a location of the mobile device 112 (e.g., a latitude and longitude or other suitable location indication, etc.) and an image of the user 108 (e.g., a selfie or facial image, etc.). The mobile device 112 then transmits, at 312, the cash request to the backend server 120. The cash request includes, in addition to the requested amount of cash, one or more identifiers of the user 108, the mobile device 112, and/or the virtual wallet application 116 (e.g., a name of the user 108, the user's account number, etc.), as well as the location of the mobile device 112, the image of the user 108, and, potentially, the session ID for the mobile device 112, etc. It should be appreciated that the image of the user 108, for example, may be omitted from the cash request in one or more embodiments (e.g., where the image is already stored in the backend server 120 or otherwise.

In turn in the method 300, the backend server 120 validates the cash request and the image of the user 108, at 314. In particular, for example, the backend server 120 validates that the cash request is an authentic request (e.g., based on the session ID for the mobile device 112 or otherwise, etc.), that the user 108 is an authorized user of the wallet application 116 (or associated account) and/or mobile device 112, that the mobile device 112 is associated with the request for the on-demand ATM service, and/or that the mobile device 112 is associated with the user 108, etc. The validation may also include, optionally, a validation of the image provided by the user 108, against a reference within the backend server 120, the payment network 106, or even the banking institution 102, etc. It should be appreciated that the backend server 120 may rely on internal services (e.g., within the backend server 120 and/or the payment network 106, etc.) or on services provided from other entities, including, for example, the banking institutions 102 and 104, etc., to facilitate such validation. In one example, the validation may be provided by the banking institution 102 that issued the account to the user 108 and/or provides the wallet application 116. The backend server 120 also associates the cash request with the session ID for the mobile device 112, if the session ID is not already included in the cash request itself.

Once validated, the backend server 120 identifies, at 316, potential sender users (as sources of cash for the requestor user 108). The identification may be limited to users enrolled in the on-demand ATM service, for example, or may include selection amongst all available users having the virtual wallet application 116. In addition, the identification may limit users based on ratings of the users, historical on-demand ATM performance, etc. In one particular example, the backend server 120 initially identifies a total number of participating users, and then selects or ranks the participating users based on past participation and performance for the on-demand ATM service (e.g., a high performing user is prioritized over low performing users (e.g., based on on-time/prompt participation, issueless exchanges, user ratings, etc.), users having participated twenty or eight times are prioritized over users having participated once or never, or combinations thereof, etc.). It should be appreciated that common, known or home locations of users may also be employed to identify and/or select/rank participating users, etc. The backend server 120 then polls the identified sender users, or the mobile devices associated therewith, for their location, at 318. In FIG. 3, the sender user 110 is identified, and therefore the backend server 120 polls the mobile device 114 for its location, at 318. The mobile device 114, like other mobile devices for identified sender users, responds, at 320, with the location of the mobile device 114. The backend server 120 may then count the number of respondents within one or more defined radiuses of the requestor user 108, and may further enforce a minimum threshold count of sender users in order to proceed with the cash request.

The backend server 120 then selects one or more of the responding mobile devices, as associated with identified sender users, based on a location of the mobile devices. Specifically, the backend server 120 may select mobile device within 0.5 miles, 1 mile, 2 miles, 5 miles, or some other suitable distance, etc., of the mobile device 112 (i.e., within a defined distance). In addition to distance, optionally, the backend server 120 may rely on a rating of a sender user, historical on-demand ATM activities, an age of a sender user's account (i.e., wallet account or payment account provisioned to the wallet application 116, etc.), etc. to help provide an additional level of security and integrity to underlying transactions. In this example, the backend server 120 selects the mobile device 114 because the mobile devices is within 0.25 miles of the location of mobile device 112 included in the cash request. As such, the backend server 120 transmits the cash request, at 322, to the mobile device 114 (and similarly does so for other mobile devices within the defined distance).

In turn, the cash request is received at the mobile device 114 and, at 324, a notice is displayed to the sender user 110, at the mobile device 114 (e.g., via presentation unit 206, etc.). When the sender user 110 selects the notice, at 326, the SDK 118 at the mobile device 114 is initialized and the cash request is displayed to the sender user 110, at 328 (e.g., after prompting the user 110 to authenticate himself/herself to the mobile device 114 and/or wallet application 116, etc.). Like above, when the SDK 118 is initialized, the mobile device 114 communicates with the backend server 120, which, in turn, in this embodiment, generates and registers a session ID for the mobile device 114 and returns the session ID to the mobile device 114. That said, the sender user 110 is permitted to view the cash request and determine if he/she has sufficient cash, on hand, to perform as the on-demand ATM for the requestor user 108. The sender user 110 may also rely on other criteria to decide to accept the cash request, or not, including a location of the requestor user 108, an image of the requestor user 108, a time of day, a day of the week, a rating of the requestor user 108 (e.g., an integrity rating, etc.), availability of meeting locations in the given area, etc. When the sender user 110 decides to accept the cash request, at 330, the sender user 110 provides a meet location (i.e., a location to deliver the cash) and an estimated time to the meet location to the mobile device 114. The mobile device 114 then transmits, at 332, a response, which includes the acceptance, the meet location and the estimated time, to the backend server 120.

Figure 8:
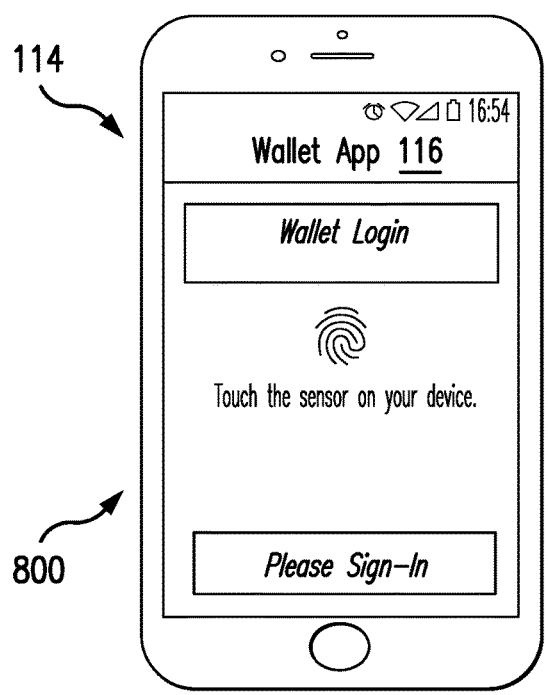
Figure 9:
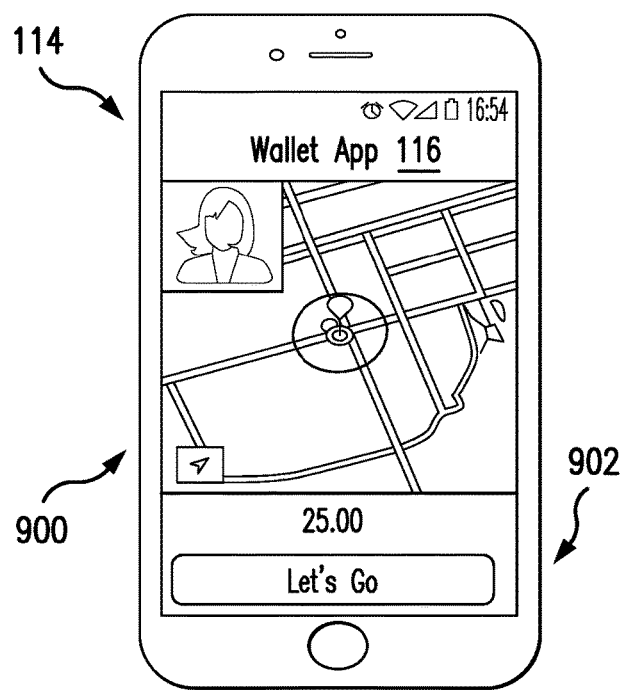
Figure 10:
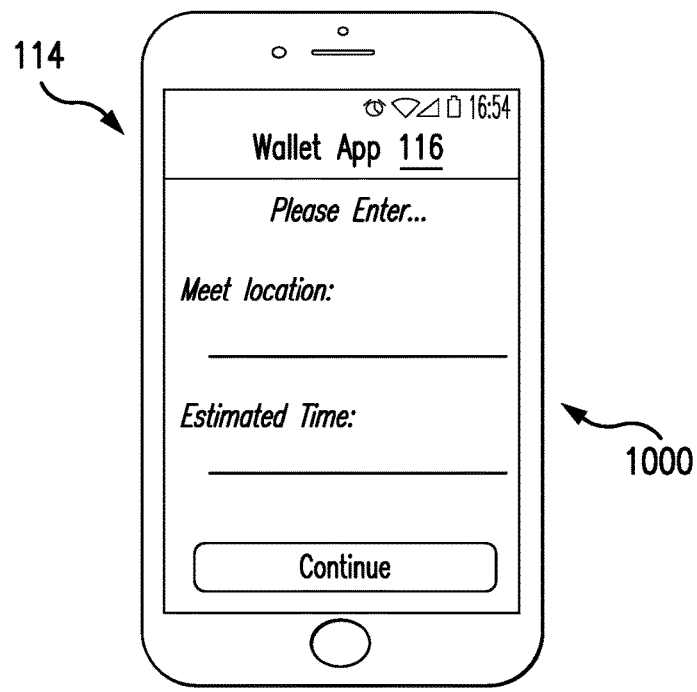

FIG. 7 illustrates an exemplary interface 700 that may be displayed to the sender user 110 at the mobile device 114 (via the wallet application 116), through which a visual notice (or other notification other than a visual notice, such as a sound, etc.) (e.g., an application banner, etc.) is displayed (or otherwise presented) to the user 110 indicating that a cash request has been submitted and that the user 110 has been selected to participate as an on-demand ATM (e.g., at operation 324, etc.). FIG. 8 illustrates an exemplary interface 800 that may be displayed to the sender user 110 at the mobile device 114 (via the wallet application 116) upon selection of the notice at the interface 700, wherein the wallet application 116 launches and the user 110 is requested to authenticate himself/herself by use of a fingerprint (or, alternatively, by use of a PIN). And, FIGS. 9 and 10 illustrate exemplary interfaces 900 and 1000 that may be displayed to the sender user 110 at the mobile device 114 (via the wallet application 116), following his/her authentication thereto, wherein the user 110 can view information relating to the requestor user 108 (and the given cash request), such as a photo of the user 108, a location of the user 108, and an amount of the cash request (via interface 900) (all of which may be used by the sender user 110 in deciding to accept the cash request by selecting the "Let's Go" button 902 (or not). In this example, the interface 1000 also permits the sender user 110 to provide a meet location and an estimated time to the meet location (via interface 1000), upon initially determining to accept the cash request of the requestor user 108 (via the interface 900), and then confirm acceptance of the cash request (via interface 1000) (and/or transmit a response to the backend server 120) (e.g., at operations 330 and 332, etc.).

Next in the method 300, the backend server 120 provides the response from the sender user 110 (and his/her mobile device 114), at 334, to the mobile device 112 (along with any other responses received from other mobile devices). The response includes, for each sender user, the meet location, the estimated time to meet, and the image of the sender user (and, potentially, other integrity data regarding the sender user 110 such as that described herein for the requestor user 108, etc.).

Figure 11:
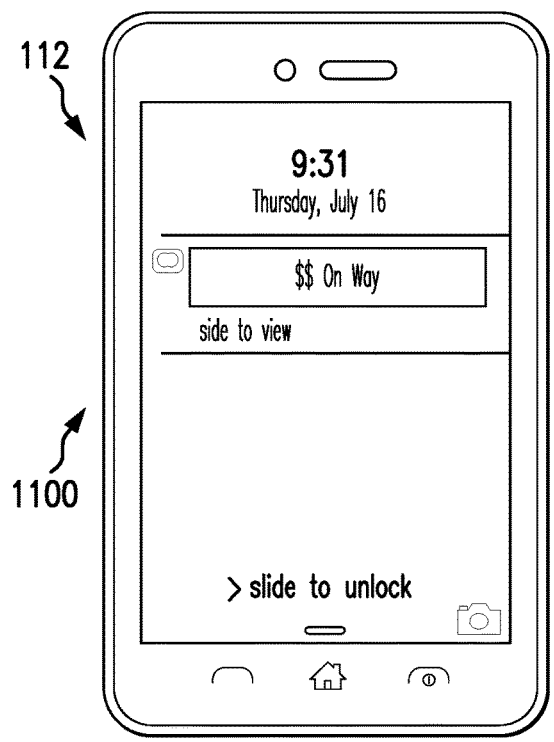
Figure 12:
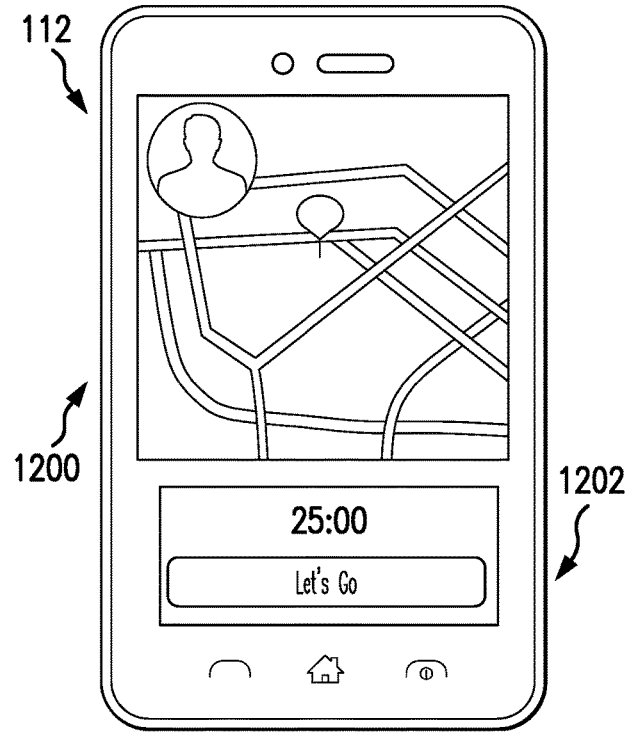

Upon receipt of the response, the mobile device 112 displays, at 336, the response(s) to the requestor user 108. Like with the sender user 110, the requestor user 108 then decides whether to accept the response(s), or not. When the requestor user 108 accepts a response, at 338, the mobile device 112 transmits an acceptance, by the requestor user 108, to the backend server 120, at 340. The backend server 120 then transmits the acceptance, by the requestor user 108, to the sender user 110 at the mobile device 114, at 342. In addition (although not shown), the backend server 120 notifies each of the other sender users, who's response was not accepted by the requestor user 108. FIG. 11 illustrates an exemplary interface 1100 that may be displayed to the requestor user 108 at the mobile device 112 (via the wallet application 116), through which a visual notice (or other notification other than a visual notice, such as a sound, etc.) is displayed (or otherwise presented) to the user 108 indicating acceptance of his/her cash request. And, FIG. 12 illustrates an exemplary interface 1200 that may be displayed to the requestor user 108 at the mobile device 112 (via the wallet application 116) upon selection of the notice at the interface 1100, wherein the wallet application 116 again launches and displays details associated with the user that accepted the cash request (i.e., the sender user 110 in this example). In so doing, the interface 1200 also includes information relating to the sender user 110 (and his/her acceptance of the given cash request), such as a photo of the user 110, a location of the user 110, and an amount of the cash request (all of which may be used by the requestor user 108 in deciding to accept the proposal from the user 110 via the "Let's Go" button 1202 (or not).

Finally in the method 300, once the users 108 and 110 are at the meet location, and meet, at 344, the cash is delivered from the sender user 110 to the requestor user 108, and the requestor user 108 and the sender user 110 initiate a P2P digital transaction, via their wallet applications 116. It should be appreciated that the delivery of the cash may be before or after the initiation of the P2P digital transaction (or substantially at the same time). In this exemplary embodiment, however, the cash is delivered first. In particular, when at the meet location, the wallet application 116 displays the image of the requestor user 108 at the mobile device 114 and, likewise, the wallet application 116 displays the image of the sender user 110 at the mobile device 112. When one identifies the other, the users 108 and 110 engage one another and the cash is delivered to the requestor user 108. In response, one or both of the users 108 and 110 provide an input for "cash delivered" to the wallet application 116 at their respective one of the mobile devices 112 and 114, whereupon the wallet application 116 enables payment. The payment may then be facilitated through a NFC connection (or tap) between the mobile devices 112 and 114, or otherwise.

Figure 13:
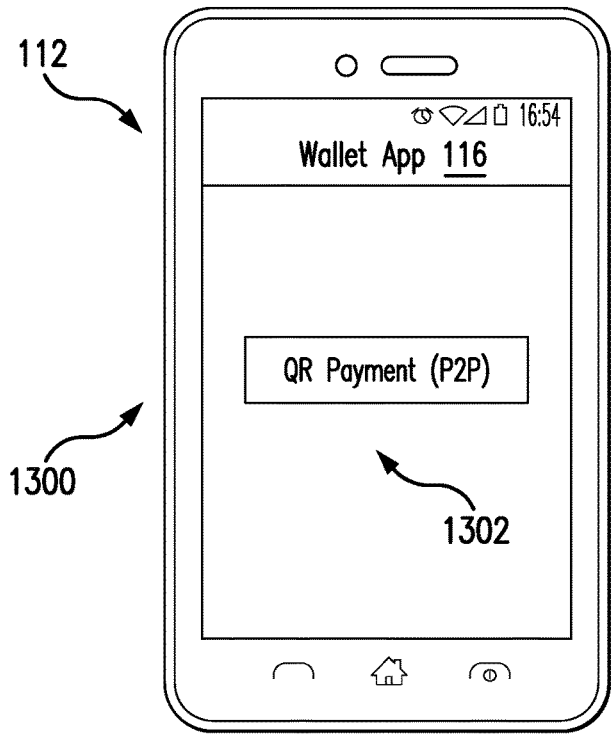
Figure 14:
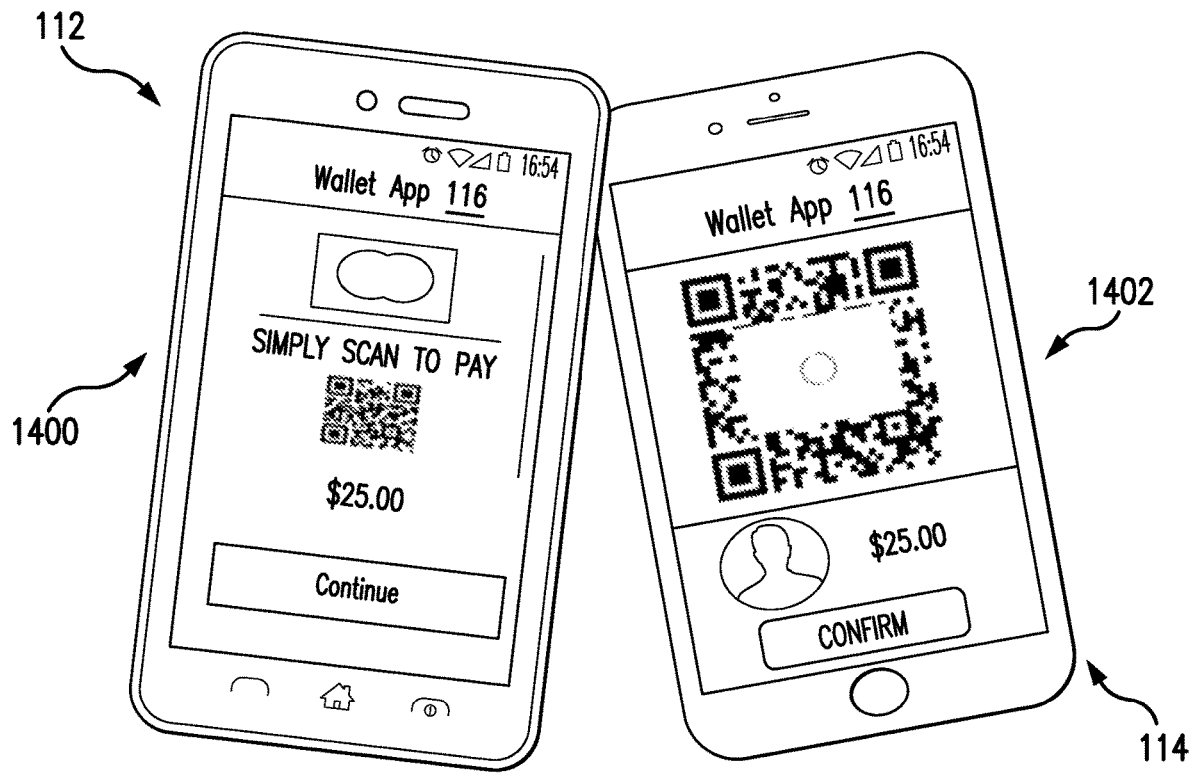

In one example, and with reference to FIGS. 13 and 14, in response to a "cash delivered" input at the mobile device 112 by the requestor user 108, the wallet application 116 displays a QR code (or other indicia), which encodes a payment account credential for the requestor user's payment account (as issued by the banking institution 102), along with the details of the transaction (e.g., location, amount, session ID for the mobile device 112, etc.). In particular, the user 108 may select the "QR Payment" button 1302 at the interface 1300 of FIG. 13 to confirm that the transaction has taken place. In response, the QR code is displayed at the mobile device 112 (via interface 1400). The sender user 110, in turn, scans the QR code with the wallet application 116 in his/her mobile device 114 (e.g., via interface 1402, etc.), which causes the wallet application 116 in the mobile device 114 to initiate a pull transaction between the requestor user's payment account (as issued by the banking institution 102) and the sender user's payment account (as issued by the banking institution 104). Settlement of the resulting P2P transaction between the banking institution 102 and the banking institution 104 may then be performed via intra-bank settlement (when the institutions 102 and 104 are on (or are part of) the same network), or may be performed by a separate P2P service (e.g., Mastercard Send, etc.).

As an alternative, in response to a "cash delivered" input at the mobile device 114 by the sender user 110, the wallet application 116 may display a QR code (or other indicia), which encodes a payment account credential for the sender user's payment account (as issued by the banking institution 104), along with the details of the transaction (e.g., location, amount, session ID for the mobile device 114, etc.). The requestor user 108, in turn, scans the QR code with the wallet application 116 in the mobile device 112, which causes the wallet application 116 in the mobile device 112 to initiate a push transaction from the requestor user's payment account to the sender user's payment account (as issued by the banking institution 104).

Figure 15:
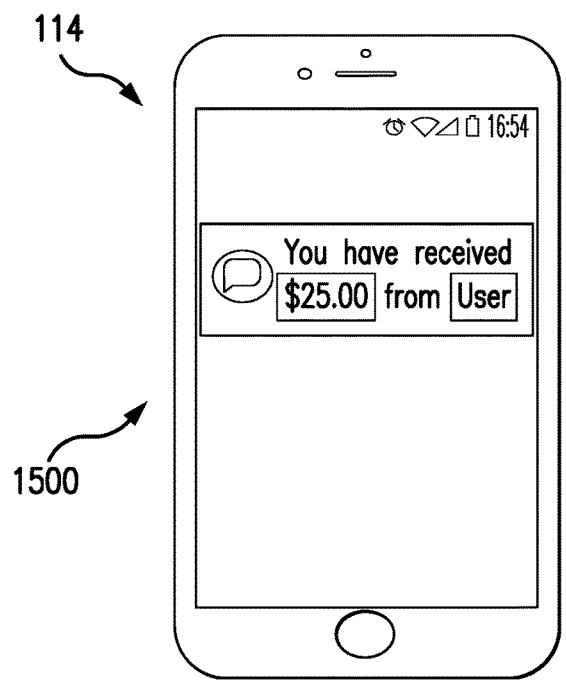

In either case, when the P2P transaction is approved, the backend server 120 is notified (e.g., via the underlying rails processing the transaction such as the institutions 102 and 104, the P2P service, etc.). The backend server 120 then confirms the transaction, at 346, with the mobile device 112 (i.e., the requestor user 108) and also confirms the transaction, at 348, with the mobile device 114 (i.e., the sender user 110). The requestor user 108 and the sender user 110 are able to report any issues with the delivery of cash, then, through the confirmation of the transaction, or otherwise, when issues arise. FIG. 15. Illustrates an exemplary interface 1500 that may be displayed to the sender user 110 at the mobile device 114 (via the wallet application 116), through which a confirmation may be presented confirming the P2P transaction (and corresponding payment to the user 110).

It should be appreciated that in the various P2P transactions described herein, the session IDs for the devices involved in the transactions are generally persistent in messages associated with the transactions (e.g., the cash requests, responses, acceptances, authorization requests, authorization replies, etc.) and through completion of the transactions. As such, the session IDs may be used as a basis for matching and/or identifying the transactions or messages associated with the on-demand ATM services (or transaction associated therewith), etc.

In view of the above, the systems and methods herein permit the proliferation of on-demand ATMs to users and/or locations unserved by conventional ATMs (and potentially without specific cash-withdrawal and/or debit accounts). The on-demand ATM services rely on technology to implement P2P digital transactions (in exchange for cash), at times and places acceptable to the users involved, whereby cash may be delivered in person and in connection with data flow between the requestor users' wallet applications and the sender users' wallet applications is distinct from conventional payment flows. What's more, the historical data related to the locations, at which the cash delivery occurs, provides insights into potential placement of conventional ATMs, as a form of actual use intelligence.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving, by a backend server, a request (e.g., a cash request, etc.) from an application (e.g., a wallet application, etc.) of a requestor mobile device associated with a requestor user, the request including an amount (e.g., of cash, etc.) requested and a location of the requestor mobile device, the requestor user associated with a first account (e.g., a first payment account, etc.); (b) polling, by the backend server, sender mobile devices for location data, each of the sender mobile devices associated with a sender user; (c) receiving, by the backend server, location data from each of the sender mobile devices, wherein a subset of the sender mobile devices are within a distance of said location of the requestor mobile device; (d) transmitting, from the backend server, the request to the subset of the sender mobile devices; (e) receiving a response (e.g., a cash response, etc.) from one of the subset of the sender mobile devices, the response including a meet location and an estimated time; (f) presenting, by the backend server, the response to the application of the requestor mobile device; (g) in response to an acceptance of the response form the requestor user at the application of the request mobile device, transmitting the acceptance to the one of the subset of the sender mobile devices, thereby enabling delivery of the amount requested to the requestor user in exchange for a digital transaction from said first account to a second account (e.g., a second payment account, etc.) associated with the sender user of the one of the subset of the sender mobile devices; (h) validating the request, based on the image of the requestor user included in the request, prior to polling the sender mobile devices; and (i) transmitting a confirmation of the exchange to the requestor mobile device and/or the one of the subset of the sender mobile devices.

Exemplary embodiments are provided so that this disclosure will be thorough, and will fully 'convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and "at least one of" includes any and all combinations of one or more of the associated listed items.

In addition, as used herein, the term product may include a good and/or a service.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in facilitating a network transaction, the method comprising:
   in response to a requestor user initiating a request for cash, capturing, by a camera input device of a requestor mobile device associated with the requestor user, via an application in the requestor mobile device, a facial image of the requestor user;
   transmitting, by the requestor mobile device, the request to a backend server, the request including an amount, a location of the requestor mobile device, and the facial image of the requestor user, and wherein the requestor user is associated with a first account;
   receiving, by the backend server, the request from the requestor mobile device;
   validating, by the backend server, the request based on the facial image of the requestor user;
   in response to validation of the request, polling, by the backend server, multiple sender mobile devices for location data, each of the multiple sender mobile devices associated with a sender user;
   receiving, by the backend server, location data from each of the multiple sender mobile devices, wherein a subset of the multiple sender mobile devices is within a distance of said location of the requestor mobile device;
   transmitting, from the backend server, the request to the subset of the multiple sender mobile devices, the request including the amount and the facial image of the requestor user for display at the multiple sender mobile devices;
   receiving a response from one of the subset of the multiple sender mobile devices, the response including a meet location and an estimated time of delivery of the amount by the sender user associated with the one of the subset of the multiple sender mobile devices to the requestor user at the meet location;
   presenting, by the backend server, the response to the application of the requestor mobile device; and
   in response to an acceptance of the response from the requestor user at the application of the requestor mobile device, transmitting the acceptance to the one of the subset of the sender mobile devices, thereby enabling the delivery of the amount to the requestor user, in person, in exchange for a digital transaction from said first account to a second account associated with the sender user of the one of the subset of the sender mobile devices.

2. The computer-implemented method of claim 1, wherein the application includes a wallet application; and wherein the amount includes an amount of cash requested.

3. The computer-implemented method of claim 1, further comprising causing the facial image of the requestor user to be displayed to the sender user at the one of the subset of the multiple sender mobile devices, in connection with the delivery of the amount requested.

4. The computer-implemented method of claim 1, further comprising transmitting a confirmation of the exchange to the requestor mobile device and/or the one of the subset of the sender mobile devices, after the digital transaction is approved and/or the amount is delivered.

5. The computer-implemented method of claim 1, further comprising:
    validating a session ID from a software development kit (SDK) in the application of the requestor mobile device for the request; and
    associating the response and/or the acceptance with the request based on the session ID included in the response and/or the acceptance.

6. The computer-implemented method of claim 1, wherein the response includes a facial image of the sender user associated with the one of the subset of the multiple sender mobile devices.

7. The computer-implemented method of claim 6, further comprising causing the facial image of the sender user to be displayed to the requestor user at the requestor mobile device, in connection with the delivery of the amount.

8. The computer-implemented method of claim 1, wherein the digital transaction includes a person-to-person (P2P) digital transaction; and
    wherein the method further comprises facilitating the P2P digital transaction for the amount between said first account and said second account.

9. A system for use in facilitating a network transaction, the system comprising:
    a non-transitory computer-readable storage medium including executable instructions defining at least part of a wallet application, which when executed by a processor of a requestor mobile device of a requestor user, cause the processor of the requestor mobile device to:
        capture, via a camera input device of the requestor mobile device, a facial image of the requestor user, the requestor user associated with a first account; and
        transmit a cash request to a backend server, the cash request including the facial image of the requestor user, an amount of cash requested, and a location of the requestor mobile device;
    wherein the backend server is configured to:
        receive the cash request from the requestor mobile device;
        validate the cash request based on the facial image of the requestor user included in the cash request;
        in response to validation of the cash request, poll multiple sender mobile devices for location data, each of the multiple sender mobile devices associated with a sender user;
        receive location data from each of the multiple sender mobile devices, wherein a subset of the multiple sender mobile devices is within a distance of said location of the requestor mobile device;
        transmit the cash request to the subset of the multiple sender mobile devices, the cash request including the amount of cash requested and the facial image of the requestor user for display at the multiple sender mobile devices;
        receive a cash response from one of the subset of the multiple sender mobile devices, wherein the cash response includes a meet location and an estimated time of delivery of the amount of cash by the sender user associated with the one of the subset of the multiple sender mobile devices to the requestor user at the meet location;
        present the cash response to the requestor mobile device; and
        in response to an acceptance of the cash response from the requestor user at the requestor mobile device, transmit the acceptance to the one of the subset of the sender mobile devices, to thereby enable the delivery of the amount of cash requested to the requestor user in exchange for a digital transaction from a first payment account associated with the requestor user to a second payment account associated with the sender user of the one of the subset of the sender mobile devices.

10. The system of claim 9, wherein the backend server is further configured to cause the facial image to be displayed to the sender user at the one of the subset of the multiple sender mobile devices, in connection with the delivery of the amount of cash requested.

11. The system of claim 9, wherein the backend server is further configured to transmit a confirmation of the exchange to the requestor mobile device and/or the one of the subset of the sender mobile devices, after the digital transaction is approved and/or the amount of cash requested is delivered.

12. The system of claim 9, wherein the backend server is further configured to:
    validate a session ID from the wallet application of the requestor mobile device for the cash request, the wallet application including an SDK; and
    associate the cash response and/or the acceptance with the cash request based on the session ID included in the cash response and/or the acceptance.

13. The system of claim 9, wherein the cash response includes a biometric and/or a facial image of the sender user associated with the one of the subset of the multiple sender mobile devices; and
    wherein the backend server is further configured to cause the biometric and/or the facial image of the sender user to be displayed to the requestor user at the requestor mobile device, in connection with the delivery of the amount of cash requested.

14. The system of claim 9, wherein the digital transaction includes a person-to-person (P2P) digital transaction; and
    wherein the backend server is further configured to facilitate the P2P digital transaction for the amount of cash requested between said first payment account and said second payment account.

* * * * *